Sept. 20, 1971     L. A. MORTENSEN     3,605,548
FASTENING DEVICE
Original Filed April 4, 1968
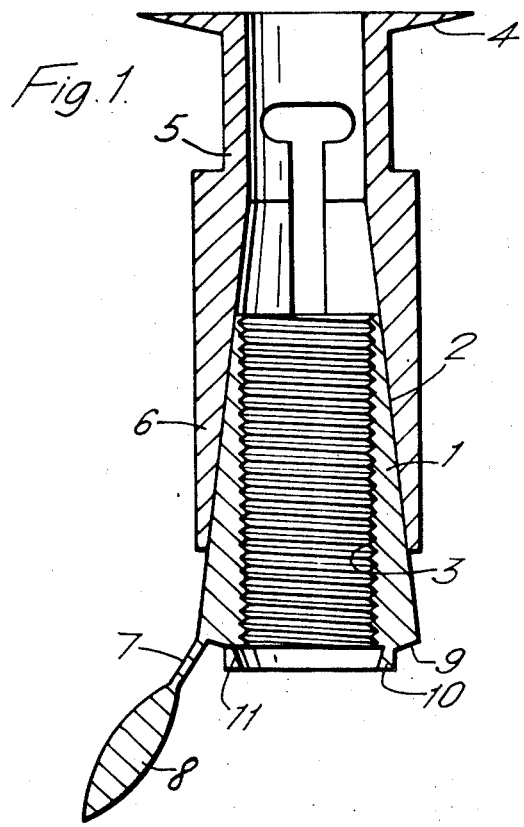
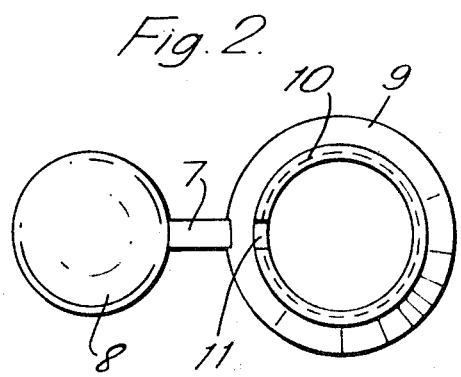
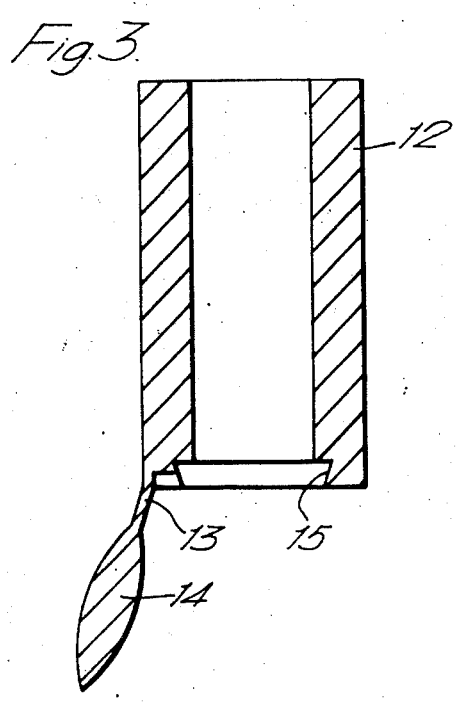
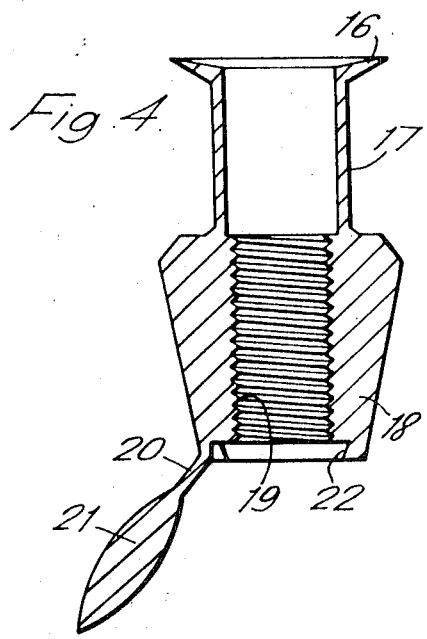
INVENTOR
LOUIS AACKERSBERG MORTENSEN
BY
Nolte & Nolte
ATTORNEYS

United States Patent Office 3,605,548
Patented Sept. 20, 1971

3,605,548
FASTENING DEVICE
Louis Aackersberg Mortensen, Kongevejen 35,
Birkerod, Denmark
Continuation of application Ser. No. 718,950, Apr. 4,
1968. This application Aug. 4, 1969, Ser. No. 849,266
Claims priority, application Denmark, Apr. 5, 1967,
1,943/67
Int. Cl. F16b 13/06
U.S. Cl. 85—73                                    1 Claim

ABSTRACT OF THE DISCLOSURE

The plastic tubular portion of a fastening device is provided at one end with a closure disc which is swingably attached thereto, and which is held in a closing position by locking means interacting between adjacent surfaces of the disc and of the tubular portion. Displaced from its closing position by the forward motion of a screw, bolt or the like advanced through the tubular portion, the disc is swung out of the way into an open position and may be subsequently reset into the closing position.

---

This application is a continuation of application Ser. No. 718,950, now abandoned.

The invention relates to a fastening device for use in connection with a screw and of the type having a tubular plastic portion into which the screw is screwed, and a closing disc that can close the plastic portion at one end, and which can be opened by screwing the screw through.

The characteristic features of the fastening device according to the invention is that the closing disc is hinged on the tubular plastic portion. Hereby it is obtained that the closing disc will not become lost.

The plastic portion and the closing flap may, according to the invention be connected by means of a hinge band, and they may be molded in one piece. Hereby there is obtained a simple, cheap and practical construction.

In the drawings there are shown some embodiments of a fastening device according to the invention:

FIG. 1 showing a longitudinal section through an expansion plug,

FIG. 2 a bottom view of same,

FIG. 3 a longitudinal section through a wall plug for insertion in a bored hole, and FIG. 4 a mold-in wall plug for molding into concrete.

The expansion plug shown in FIG. 1 consists of an inner part 1 and is made in plastic, for instance rather hard stiff elastic plastic. It has a conical outer surface 2, for instance with a cone apex angle of 12°, and an inner cylindrical screw thread 3 for a machine screw. The outer part also consists of plastic and is made by injection molding. It has an end flange 4, a short tubular end portion 5, and an expansion portion 6 divided up into two or more longitudinal extending sectors, said expansion portion having an inner conical surface corresponding to the outer surface of the inner part 1 and having a cylindrical outer surface. The outer part is preferably made of a relatively hard stiff bending-elastic plastic.

The inner part 1 is molded integrally with a hinge band 7 and a closing disc 8 carried by the hinge band, said closing disc having a lens-shaped cross section. The inner part has, at its bored end, a conical end surface 9 and an axially projecting outer cylindrical collar 10 in which there is made a recess 11 for the hinge band 7. The inner side of the collar 10 is undercut. The closing disc 8 can, by bending the hinge band 7, be inserted in the opening in the collar 10 the hinge band 7 being received in the recess 11. When a screw is screwed through the inner part, the end of the screw will push the closing disc away from its position in the collar 10. The closing disc may later be returned to its position in the collar 10.

The wall plug for inserting in a hole and shown in FIG. 3 consists of a tubular plastic portion 12 which preferably has conventional outer and inner grooves and may consist of relatively soft plastic. The tubular plastic portion 12 is made in one piece with a hinge band 13 and a closing disc 14 which, by bending the hinge band 13, can be inserted in the end aperture of the tubular plastic portion 12 and may be brought into engagement with a circumferential groove 15 made therein.

When using the wall plug shown in FIG. 3 the closing disc 14 is closed and the plug is inserted in a bored hole. Thereafter a screw is screwed into the plug. When necessary the screw can be screwed entirely through the plug, thereby pushing the closing disc into its open position.

The mold-in wall plug shown in FIG. 4 and serving for being molded into concrete has a flange 16 and a relatively thin-walled tubular portion 17 and a thick-walled tubular portion 18 in which there is made an inner screw thread 19, for instance a cylindrical screw thread, for a machine screw. The portion 18 is molded in one piece with a hinge band 20 and a closing disc 21 which, by bending the hinge band 20, can be inserted in the end apertures of the portion 18 and be brought into engagement with a circumferential groove 22 made therein. When the mold-in wall plug is to be molded in, the closing disc 21 is closed first. The shown embodiments entails that the molding plug may be molded while using a molding core that is supported at both ends in the mold.

The shown and described embodiments are only to be considered by way of example as several variations are conceivable within the scope of the invention. In an expansion plug of the same type as the one shown in FIGS. 1 and 2 it will thus be possible to make the outer part with a closing disc hinged onto it. In that case the sectors should be connected with each other during the manufacture by means of thin-walled portions which can be stretched or torn apart.

What is claimed is:

1. A fastening device for use in connection with a screw comprising a tubular portion constituted of a plastic and open at each end, a closure disc constituted of a plastic and movable between a first position closing one of said open ends and a second position uncovering said one end, said disc being of circular configuration and in said first position being adapted to be engaged along its periphery by said recess, elastically recoverably bendable hinge means constituted of a plastic and connecting and being integrally formed with said disc and said tubular portion, and resilient, non-permanently deformable latching means constituted of a plastic and for releasably holding said disc in said first position, said latching means being defined by an annular undercut recess in the tubular portion proximate to said open end.

References Cited

UNITED STATES PATENTS

| 1,241,827 | 10/1917 | Davis | 52—704 |
|---|---|---|---|
| 2,277,056 | 3/1942 | Coffman | 85—83 |
| 2,334,046 | 11/1943 | Tinnerman | 85—35 |
| 3,313,078 | 4/1967 | Rohe | 52—708 |
| 3,413,887 | 12/1968 | Von Wolff et al. | 85—83 |
| 3,472,111 | 10/1969 | Ono | 84—74 |

FOREIGN PATENTS

| 767,444 | 5/1934 | France | 85—69 |
|---|---|---|---|
| 624,714 | 6/1949 | Great Britain | 85—33 |

EDWARD C. ALLEN, Primary Examiner

U.S. Cl. X.R.

52—704, 707; 85—82